March 17, 1970     K. VÖGTLIN     3,501,768
RECORDING ARRANGEMENT FOR A VEHICLE HAVING
DIFFERENT OPERATORS
Filed Aug. 29, 1968
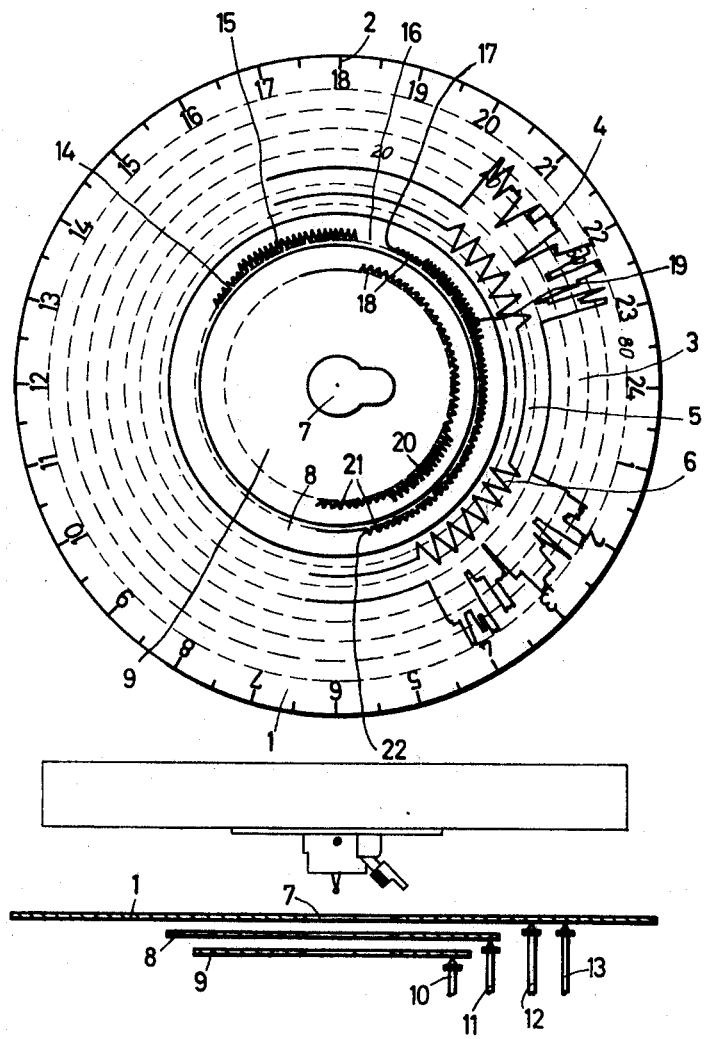
Inventor
Karl Vögtlin United States Patent Office 3,501,768
Patented Mar. 17, 1970

3,501,768
RECORDING ARRANGEMENT FOR A VEHICLE HAVING DIFFERENT OPERATORS
Karl Vögtlin, Villingen, Germany, assignor to Kienzle Apparate GmbH, Villingen, Black Forest, Germany
Filed Aug. 29, 1968, Ser. No. 756,161
Claims priority, application Germany, Sept. 2, 1967, K 63,267
Int. Cl. G01d 9/28
U.S. Cl. 346—45                               10 Claims

ABSTRACT OF THE DISCLOSURE

Several drivers or operators of vehicles provided with recording apparatus, have personal record carriers. When one or two operators are on duty on a particular vehicle, the respective personal record carrier, or record carriers, are attached to a vehicle record carrier for simultaneous recording movement. Recordings representing the operations of the vehicle are simultaneously made on the vehicle record carrier with recordings on the personal record carrier, or carriers, representing the work of the operator or operators. By evaluation of the recordings on the personal record carrier of each operator, the work of each operator can be individually determined, and each operator can use his personal record carrier on different vehicles.

BACKGROUND OF THE INVENTION

The present invention relates to a recording arrangement for vehicles, and more particularly to a tachographic recording arrangement in which record carrier, such as circular diagram sheets, are rotated by a clockwork, and receive recordings representing operations of the vehicle, and other recordings representing the working time and type of work carried out by the operator or driver of the car.

In accordance with the prior art, recordings are made on a record carrier representing the varying speed of the vehicle, the revolutions per minute of the motor, and the distance travelled by the car, and also recordings showing the time spent by the operator, or operators, of the vehicle for driving, assisting the driver, and carrying out other work. The recordings concerning the work of the drivers are carried out by vibratory recording means so that, for example, the drive periods are indicated by a bar-shaped zig-zag line, and other time periods indicated by a line.

The bar-shaped diagram is used for determining the working time, and the time of driving of an operator, and the wages of the operator are determined from the graphical recordings on the record carrier sheet.

The development of long-distance motorized transportation has resulted in the necessity of assigning two operators or drivers to long-distance coaches and freight carrying trailers.

In order to make distinguishable recordings representing the time periods during which one or the other operator has driven the vehicle, the prior art provides recording apparatus in which the recordings associated with the work of the individual drivers are bar-shaped and of different width for different drives, or staggered in radial direction on the record carrier sheet, as shown and described in U.S. Patents No. 2,743,987 and Ser. No. 3,004,818.

The actual working time includes driving time, time for loading and unloading, time for servicing and repairing the vehicle, such as changing tires, and also time during which one of the operators rests on the vehicle, while the other operator drives the car. In order to determine the actual working times, the prior art effects the recording of a bar-shaped recording by means of an oscillator acting on the recording means and being set by each driver by a suitable means while the vehicle is at a standstill so that individual distinguishable recordings are made for each driver. Another apparatus of the prior art requires a manual setting only when the additional working time following the driving time is terminated, and the operator has a rest period, or has finished his duty on the vehicle. For the automatic evaluation of the graphical recordings and also for providing clear recordings, it is advantageous to make the bar-shaped zig-zag recordings of the individual operators along spaced paths on the record carrier. This form of recording permits it in a very simple manner to represent the type of work carried out by each operator by a variation of the width of the bar-shaped recording by assigning amplitude of oscillation of the recording stylus to each type of work of each operator.

Recording arrangements of this type have not only the advantage of a fast and reliable recording of data for the purpose of determining the wages of the operators, but also relieve the operators from making notes in a log so that the operators are relieved of paper work.

A particular difficulty arises if the entire two-man crew of a vehicle is exchanged for another crew for continuing the operation of the same vehicle, or if one operator of a crew is replaced by another operator. In this event, the working times and type of work recorded until the change of the crew, is not apparent from the continued recordings on the record carrier since the graph indicating the duration and type of work of a previous driver is directly continued with a graph indicating the same data for another driver. The recorded graphs of two subsequent operators or drivers cannot be separated, since on the same record carrier, a continuous graph must be made for recording the operational data of the vehicle, such as speed and distance travelled. The recording is without any value, unless a particular numerical identification is noted on the record carrier. If an operator is transferred from one vehicle to the other vehicle, the evaluation of his work from two different record carriers having recordings concerning two different vehicles, respectively, is very difficult. This is particularly the case, if during one continuous long-distance trip of a vehicle, one operator of a crew is replaced by another operator.

SUMMARY OF THE INVENTION

It is one object of the invention to overcome the disadvantages of recording arrangements according to the prior art for recording working data of operators, and operational data of the vehicle, and to provide a recording arrangement in which data concerning the operators and data concerning the vehicle, are separately recorded.

Another object of the invention is to provide a personal record carrier for each operator, and a separate vehicle record carrier, and to simultaneously record working data of the operator on the personal record carrier and operational data of the vehicle on the vehicle record carrier.

Another object of the invention is to provide personal record carriers for all operators of a vehicle so that each operator can individually present his personal record carrier with the recordings thereon for evaluation of his work.

Another object of the invention is to provide a personal record carrier for each operator so that working times spent on two different vehicles are recorded on the same personal record carrier of the respective operator.

With these objects in view, the present invention provides a new recording arrangement for a vehicle having different operators. One embodiment of the invention comprises a movable, preferably rotary, vehicle record carrier having a recording area and an unused area; vehicle recording means for recording on said recording area at least one graph representing operations of the vehicle; a personal record carrier for one operator who is on duty on the vehicle; and at least one operator recording means for recording on the personal record carrier at least one graph representing the work carried out by the operator on duty on the vehicle.

The personal record carrier is superimposed on the unused area of the vehicle record carrier and attached to the same for synchronous movement so that the vehicle recording means and the operator recording means simultaneously record on the vehicle record carrier and on the personal record carrier, respectively; the recordings on the personal record carrier representing data concerning the work of the operator, and the recordings on the vehicle record carrier representing operational data of the vehicle.

Each operator can attach his personal record carrier to the vehicle record carrier at the beginning, and remove the same at the end of his work on the vericle for evaluation of the recordings thereon, which can be carried out independently of the evaluation of the personal record carriers of the other operators and of the evaluation of the recordings on the vehicle record carrier.

Any operator who is switched to duty on another vehicle, can take his personal record carrier along and attach it to the vehicle record carrier of the vehicle to which he is now assigned.

When more than one operator, for example a crew of two operators, is assigned to a vehicle, each operator uses a personal record carrier of a different size, and the personal record carrier of one operator covers only a part of the personal record carrier of the second operator so that a part of the personal record carrier of the second operator is left free for recordings. Individual operator recording means are provided for each of the personal record carriers, in addition to the vehicle recording means which make recordings on the vehicle record carrier.

In the preferred embodiment, a smaller and a larger circular personal record carrier sheet are superimposed on an unused central area of a vehicle record carrier whose outer annular portion is used for the recordings representing the operations of the vehicle.

Since the personal record carriers of the operators are separable from the vehicle record carrier, any operator of a crew can leave the respective vehicle, continue his duty on another vehicle as driver or assistant driver, and nevertheless record all working times spent on both vehicles on the same personal record carrier which is removed from the recorder of the first vehicle, and inserted into the recorder of the second vehicle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a plan view illustrating two personal record carrier sheets superimposed on a vehicle record carrier sheet, and recorded graphs on the record carrier sheets; and FIG. 2 is a schematic axial sectional view of the record carrier sheets shown in FIG. 1, and including an elevation of recording means for making graphical recordings on the record carrier sheets.

DESCRIPTION OF THE PREFERRED EMBODIMENTS

A circular record carrier sheet or disk 1 is driven in the usual manner by a clockwork to rotate one revolution during twenty-four hours, as indicated by the indicia 1–24 on the peripheral time scale 2. An annular recording area 3 is provided for recordings 4 made by a recording means 13 and representing the varying speed of the car by a speed graph 4. Radial portions of the speed graph 4 represent acceleration and deceleration, and a circular portion concentric with the axis of rotation of record carrier sheet 1, indicates that the vehicle was at a standstill.

In an inner annular recording area 5, a graph 6 representing the distance travelled by the vehicle is made by another recording means 12. Zig-zag portions of the graph illustrate distance travelled by the vehicle, and circular portions of graph 6 indicate that the vehicle has not travelled any distance. For example, between 10:45 p.m. and 1:30 a.m., the vehicle was not operated.

Since the annular area 3, 5 of record carrier sheet 1 is used for recording data concerning the operation of the vehicle, record carrier sheet 1 will be hereinafter referred to as vehicle record carrier.

The central area of vehicle record carrier 1 is not used for recordings, and is covered by a circular record carrier sheet 8. A central circular portion of record carrier sheet 8 is not used for recordings, and is covered by another circular record carrier sheet 9.

All three record carrier sheets 1, 8 and 9 are circular and have centers coinciding in an axis of rotation passing through a non-circular central opening 7 in each record carrier sheet.

FIG. 2 shows the three carrier sheets spaced from each other, but actually the record carrier sheets are directly superimposed, and a central post, not shown, having the same outline as the non-circular cutout 7 passes through the latter. Threaded means on the post, not shown, clamp the three record carrier sheets together so that the same are attached to each other and rotate in synchronism when the central post, not shown, is rotated by the clockwork, not shown.

Recording means 11 record a graph on the outer annular area of record carrier sheet 8, and recording means 10 records a graph on the outer annular area of the smaller record carrier sheet 9 during synchronous rotation of the three record carrier sheets.

The two record carrier sheets 8 and 9 are respectively associated with two operators or drivers forming the crew of a vehicle. Recording means 10, 11 respectively record data concerning the work of the two operators on record carrier sheets 9 and 8. Since recording means 10 and 11 are correlated with operators of the vehicle, recording means 10 and 11 will be hereinafter referred to as operator recording means. Since each of record carrier sheets 8 and 9 is used only by one operator, they will be hereinafter referred to as personal record carriers.

The unused central area of the vehicle record carrier 1, which is covered by personal record carrier 8, may be imprinted with the license number of the vehicle and similar information, and may be used in conventional apparatus for recording graphs if no personal record carriers are provided. The diameters of the record carrier sheets 1, 8 and 9 are seelcted so that annular areas of sufficient radial width remain free for receiving recordings.

In the example illustrated in FIG. 1, the personal record carrier 8 was already used in another recording device of another vehicle where a period of readiness 14 and a driving period 15 of the respective operator to whom the personal record carrier 8 belongs, was recorded. The graph portion 14 and the graph portion 15 are bar-shaped and consist of a narrow zig-zag line and a zig-zag line of greater amplitude, respectively produced by vibrating recording means 11. When the respective operator left the first vehicle, he removed his personal record carrier 8 and transferred the same to the recording device of another vehicle which was at a standstill during this time, as indicated by the circular line portions of graphs 4 and 5 at about 6:30 p.m. An interval 16 is shown in FIG. 1 between the graph 15 recorded in the first card, and the graph 18 which started at the point 17 at about 7:30 p.m. At first, the operator did not drive, as indicated by the graph portion 18, and then started driving as indicated by the wider bar-shaped portion 19 of the graph on his personal record carrier 8. Shortly before the respective operator had started his work on the second vehicle, another operator, whose personal record carrier 9 is attached to record carriers 1 and 8, had started his work, as indicated by the graph on the second record carrier 9. After a rest period for both operators, the operator of personal record carrier 9 started driving as indicated by the graph portion 20 while the other operator was in a condition of readiness, or performed some auxiliary work. When the car stopped at about 4 a.m., both operators continued with auxiliary work or by being in readiness as indicated by graph portions 21 and at the end 22 of the graph on personal record carrier 8, the respective operator has finished his working time, but has left his personal record carrier 8 in the recording apparatus so that a thin line was recorded until the other driver terminated his duty and removed the record carriers from the recording apparatus.

When an operator uses the same personal record carrier in two different vehicles, as explained above, it may happen that two operators having personal record carriers of the same diameter, happen to be on duty on the same vehicle. In view of this possibility, it is advisable that each operator carries personal record carriers of different diameters which he uses in accordance with the diameter of the personal record carrier used by the other member of the crew of the vehicle.

If replacement of one or both members of a crew is not intended, and if no member of the crew of one vehicle is transferred to another vehicle, the personal record carriers of the operators need not be used, and the graphs representing the working times and type of work carried out by two operators, are simply made on the central area of vehicle record carrier 1 in accordance with the prior art.

It is an advantage of the arrangement of the present invention that the personal record carriers can be used by the operators of the vehicles of a fleet in conventional and standard recording apparatus.

It will be understood that each of the elements described above, or two or more together, may also find a useful application in other types of recording arrangements for vehicles having different operators or drivers, differing from the types described above.

While the invention has been illustrated and described as embodied in a recording arrangement in which each operator or driver has a personal record carrier so that work carried out by the driver on several vehicles is recorded on the same personal record carrier, it is not intended to be limited to the details shown, since various modifications and structural changes may be made without departing in any way from the spirit of the present invention.

What is claimed as new and desired to be protected by Letters Patent is set forth in the appended claims:

1. Recording arrangement for a vehicle having different operators, comprising, in combination, a movable vehicle record carrier having a recording area and an unused area; vehicle recording means for recording on said recording area at least one graph representing operations of the vehicle; a personal record carrier for one operator who is on duty on the vehicle, said personal record carrier being superimposed on said unused area of said vehicle record carrier and attached to said vehicle record carrier for synchronous movement; and at least one operator recording means for recording on said personal record carrier at least one graph representing work carried out by the operator on duty on the vehicle during the operations of the latter recorded on said vehicle record carrier so that each operator can attach his personal record carrier to said vehicle record carrier at the beginning and remove the same at the end of his work on the vehicle for evaluation of the recordings thereon independently of the evaluation of the personal record carriers of the other operators, and the evaluation of the recordings on the vehicle record carrier, and also for attachment of his personal record carrier to the vehicle record carrier of another vehicle.

2. Recording arrangement as claimed in claim 1 wherein said personal record carrier has a recording area on which said one operator recording means records, and an unused area; comprising another personal record carrier of another operator on duty on the vehicle, said other personal record carrier being superimposed on, and covering said unused area of said personal record carrier of said one operator and attached to the same and to said vehicle record carrier for synchronous movement; and comprising another operator recording means for recording on said other personal record carrier a graph representing work carried out by the other operator on duty on the vehicle during the operations of the latter recorded on said vehicle record carrier whereby the recordings on said personal record carriers of said operators on duty can be independently evaluated.

3. Recording arrangement as claimed in claim 1 wherein said vehicle recording means and said operator recording means are disposed in a line transverse to the direction of movement of said vehicle record carrier and said personal record carrier so that simultaneously made recording on said vehicle record carrier and on said operator personal record carrier are aligned.

4. Recording arrangement as claimed in claim 3 wherein said vehicle record carrier and said personal record carriers of said operators have registration portions for attaching any selected personal record carrier to said vehicle record carrier in the same relative position.

5. Recording arrangement as claimed in claim 1 wherein said vehicle record carrier and said personal record carrier are attached to each other for synchronous rotation about a common axis; wherein said vehicle record carrier has an outer annular recording area, and an unused central area within said annular recording area; and wherein said personal record carrier is smaller than said vehicle record carrier and covers only said central area of said vehicle record carrier.

6. Recording arrangement as claimed in claim 5 wherein said vehicle record carrier and said central area thereof are circular and have a first diameter and a smaller second diameter, respectively; wherein said personal record carrier is circular and has said second diameter and covers said circular central area; and wherein said vehicle recording means and said operator recording means are disposed along a radial line passing through said axis of rotation.

7. Recording arrangement as claimed in claim 6 wherein said vehicle record carrier and said personal record carrier have registering non-circular central cutouts for attaching any selected personal record carrier to said vehicle record carrier in the same angular position.

8. Recording arrangement as claimed in claim 5 wherein said personal record carrier has an outer anular personal recording area and an unused central area within said outer annular personal recording area; comprising another personal record carrier of another operator on duty on the vehicle, said other personal record carrier being superimposed on, and covering said unused central area of said personal record carrier and being attached to the latter and to said vehicle record carrier for synchronous movement; and comprising another operator recording means for recording on said other personal record carrier a graph representing work carried out by the other operator on duty on the vehicle during the operations of the latter recorded on said vehicle record carrier whereby the recordings on said personal record carriers of said operators on duty can be evaluated.

9. Recording arrangement as claimed in claim 8 wherein at least said operator recording means are vibratory for recording a bar-shaped graph during driving of any one operator on duty on the vehicle, and record a line during other activities of any one operator.

10. Recording arrangement as claimed in claim 1 wherein said personal recording means is vibratory for recording a bar-shaped graph during driving of said operator, and records a line during other activities of said operator.

References Cited

UNITED STATES PATENTS

| | | | |
|---|---|---|---|
| 1,483,039 | 2/1924 | Bickel | 346—137 X |
| 3,197,779 | 7/1965 | Chatelain et al. | 346—7 |

JOSEPH W. HARTARY, Primary Examiner

U.S. Cl. X.R.

346—7, 137